US012799369B2

(12) United States Patent
Everson et al.

(10) Patent No.: US 12,799,369 B2
(45) Date of Patent: Nov. 17, 2026

(54) HOT MELT ADHESIVE COMPOSITIONS INCLUDING MODIFIED STYRENE BLOCK COPOLYMER AND ARTICLES INCLUDING THE SAME

(71) Applicant: H.B. Fuller Company, St. Paul, MN (US)

(72) Inventors: Daniel A. Everson, Lakeville, MN (US); Ethan A. Gormong, White Bear Lake, MN (US)

(73) Assignee: H.B. Fuller Company, St. Paul, MN (US)

( * ) Notice: Subject to any disclaimer, the term of this patent is extended or adjusted under 35 U.S.C. 154(b) by 270 days.

(21) Appl. No.: 18/655,732

(22) Filed: May 6, 2024

(65) Prior Publication Data

US 2024/0376346 A1 Nov. 14, 2024

Related U.S. Application Data

(60) Provisional application No. 63/590,890, filed on Oct. 17, 2023, provisional application No. 63/500,860, filed on May 8, 2023.

(51) Int. Cl.

*C09J 7/35* (2018.01)
*C09J 125/04* (2006.01)
*C09J 153/00* (2006.01)

(52) U.S. Cl.

CPC ............... *C09J 7/35* (2018.01); *C09J 125/04* (2013.01); *C09J 153/005* (2013.01); *C09J 2301/302* (2020.08); *C09J 2301/312* (2020.08); *C09J 2301/408* (2020.08)

(58) Field of Classification Search

CPC ........ C09J 7/35; C09J 125/04; C09J 153/005; C09J 2301/312; C09J 2301/408; C09J 2301/302

See application file for complete search history.

(56) References Cited

U.S. PATENT DOCUMENTS

| | | | | |
|---|---|---|---|---|
| 5,514,122 | A * | 5/1996 | Morris | C09J 7/385 604/389 |
| 6,620,143 | B1 * | 9/2003 | Zacharias | A61F 13/5611 604/385.03 |
| 9,822,283 | B2 * | 11/2017 | Inoue | C09J 7/21 |
| 10,351,298 | B2 * | 7/2019 | Zimmel | C09J 153/00 |
| 2004/0127614 | A1 * | 7/2004 | Jiang | C09J 7/20 524/270 |
| 2005/0032952 | A1 * | 2/2005 | Bonfanti | C09J 167/00 524/492 |
| 2005/0222356 | A1 * | 10/2005 | Joly | C08L 53/025 526/348.1 |
| 2006/0030665 | A1 * | 2/2006 | Joly | C08F 297/044 525/89 |
| 2013/0184425 | A1 * | 7/2013 | Cheng | C09J 125/06 526/346 |
| 2014/0324006 | A1 * | 10/2014 | Zhong | C09J 191/06 524/505 |
| 2016/0101209 | A1 * | 4/2016 | Dubois | B32B 7/12 524/271 |
| 2017/0240784 | A1 * | 8/2017 | Jin | C08L 23/06 |
| 2018/0037777 | A1 * | 2/2018 | DeJesus | A61L 15/24 |
| 2020/0248047 | A1 * | 8/2020 | Yuan | A61L 15/20 |
| 2021/0317346 | A1 * | 10/2021 | Misra | C09J 11/06 |
| 2022/0073790 | A1 * | 3/2022 | Chen | C09J 7/35 |
| 2022/0325145 | A1 * | 10/2022 | Minix | C08L 23/12 |
| 2024/0141215 | A1 * | 5/2024 | Zhao | C09J 153/02 |
| 2024/0376346 | A1 * | 11/2024 | Everson | C09J 7/35 |

FOREIGN PATENT DOCUMENTS

| | | | |
|---|---|---|---|
| CN | 103540281 | 8/2016 | |
| CN | 106047239 | 10/2016 | |
| CN | 107722887 | 2/2018 | |
| CN | 111978896 | 11/2020 | |
| CN | 110776861 | 9/2021 | |
| CN | 111662662 | 4/2022 | |
| CN | 114634778 | 9/2023 | |
| WO | WO-0245763 A2 * | 6/2002 | A61L 15/58 |
| WO | WO2020243424 | 12/2020 | |

OTHER PUBLICATIONS

TSRC Corporation "Taipol Sebs 7126", Technical Data Sheet, Feb. 2018,1 Page , Taiwan.

* cited by examiner

*Primary Examiner* — Guy K Townsend
(74) *Attorney, Agent, or Firm* — Kristi Halloran

(57) ABSTRACT

The invention features a hot melt adhesive compositions for disposable absorbent articles including from 5% by weight to 40% by weight of a non-modified styrenic block copolymer, from 0.5% by weight to 30% by weight of a modified styrenic block copolymer, from 30% by weight to 65% by weight of a tackifying agent, and from 10% by weight to 45% by weight of a plasticizer, wherein the hot melt adhesive composition comprises less than 5% by weight of a wax.

19 Claims, No Drawings

HOT MELT ADHESIVE COMPOSITIONS INCLUDING MODIFIED STYRENE BLOCK COPOLYMER AND ARTICLES INCLUDING THE SAME

CROSS REFERENCE TO RELATED APPLICATIONS

This application claims the benefit of U.S. Provisional Application No. 63/500,860 filed May 8, 2023 and U.S. Provisional Patent Application No. 63/590,890 filed Oct. 17, 2023, which is incorporated herein.

BACKGROUND

Hot melt adhesive compositions are often used to bond substrates together to maintain the two substrates in a fixed relation to each other or to contribute to the integrity and functionality of the finished article. In the area of industrial adhesives, hot melt adhesive compositions are commonly used to bond together or to contribute to the integrity and functionality of a wide variety of articles including packaging materials (e.g., cases and cartons) and disposable absorbent articles including non-woven substrates e.g., adult incontinence products, disposable diapers, sanitary napkins, bed pads, puppy pads, medical dressings, etc.

There can be multiple hot melt adhesive compositions used in the manufacture of a disposable absorbent article. For example, in the manufacture of a disposable diaper, hot melt adhesive compositions are used as construction adhesives (e.g. bonding the back sheet to the nonwoven and optionally the absorbent pad), as elastic attachment adhesives (e.g. bonding the elastic material to the back sheet in for example the leg or waist area), for core stabilization (e.g. applying a hot melt adhesive composition to the absorbent core to increase the strength of the core), for positioning, i.e. used on used on disposable absorbent (e.g., feminine hygiene) articles to position the article on a substrate (e.g., undergarment) and as an elastic material to provide stretch properties to the disposable absorbent article.

For hot melt adhesive compositions to work well in adhesive applications e.g., disposable absorbent article applications, stick to skin applications, etc. there is a need for hot melt adhesive compositions that have improved adhesion to a variety of substrates under a variety of conditions.

SUMMARY

In one aspect, the invention features a hot melt adhesive composition including from 5% by weight to 40% by weight of a non-modified styrenic block copolymer, from 0.5% by weight to 15% by weight of a modified styrenic block copolymer, from 30% by weight to 65% by weight of a tackifying agent and from 10% by weight to 45% by weight of a plasticizer, wherein the hot melt adhesive composition comprises less than 5% by weight of a wax. In another aspect, the invention features a hot melt adhesive composition including from 5% by weight to 40% by weight of a non-modified styrenic block copolymer, from 0.5% by weight to 30% by weight of a modified styrenic block copolymer, from 30% by weight to 65% by weight of a tackifying agent, from 10% by weight to 45% by weight of a plasticizer, wherein the hot melt adhesive composition comprises less than 5% by weight of a wax.

In one embodiment, the invention features a disposable absorbent article including the hot melt adhesive composition. In another embodiment, the hot melt adhesive composition includes less than 4% by weight of a wax or even from 0.5% by weight to less than 5% by weight of a modified wax.

In another embodiment, the modified styrenic block copolymer is an organic acid or anhydride modified styrene block copolymer selected from the group consisting of poly(styrene-b-(ethylene-co-butylene)-b-styrene and poly(styrene-b-(ethylene-alt-propylene)-b-styrene) and poly(styrene-b-isobutylene-b-styrene). In a different embodiment, the total of the non-modified styrenic block copolymer and the modified styrenic block copolymer has an average styrene content of from 20% by weight to 45% by weight. In another embodiment, the total of the non-modified styrenic block copolymer and the modified styrenic block copolymer has an average styrene content of from 25% by weight to 45% by weight. In a different embodiment, the total of the non-modified styrenic block copolymer and the modified styrenic block copolymer has an average diblock content of from 0% by weight to 30% by weight. In one embodiment, the total of the non-modified styrenic block copolymer and the modified styrenic block copolymer has an average diblock content of from 10% by weight to 25% by weight.

In one embodiment, the tackifying agent has an average R&B softening point of from 100° C. to 130° C. In another embodiment, the tackifying agent is a hydrogenated hydrocarbon resin selected from the group consisting of hydrocarbon resins, aromatic modified hydrocarbons resin, aromatic hydrocarbon resin and combinations thereof. In a different embodiment, the plasticizer is selected from the group consisting of naphthenic oil, paraffinic oil, polyisobutylene, polybutene and combinations thereof.

In one embodiment, the hot melt composition has a Brookfield Viscosity at 149° C. of no greater than 15,000 cP. In another embodiment, the hot melt composition has a Brookfield Viscosity at 121° C. of no greater than 15,000 cP.

In another aspect the invention features a hot melt pressure sensitive adhesive composition including from 5% by weight to 25% by weight of a non-modified styrene block copolymer, from 1% by weight to 10% by weight of a modified styrenic block copolymer, from 40% by weight to 60% by weight of a hydrogenated hydrocarbon tackifying agent, and from 15% by weight to 45% by weight of an oil, or even a naphthenic oil, wherein the hot melt adhesive composition comprises less than 5% by weight of a wax.

In one embodiment, the non-modified styrenic block copolymer and the modified styrenic block copolymer has an average styrene content of from 25% by weight to 45% by weight, or even from 15% by weight to 30% by weight, and an average diblock content of from 10% by weight to 25% by weight.

In another embodiment, the invention features a disposable absorbent article including the hot melt pressure sensitive adhesive composition. In one embodiment, the invention features an article selected from the group consisting of medical tape, bandage, wearable device, athletic tape, kinesiology tape and wound dressing including the hot melt adhesive composition.

In a different embodiment, the modified styrenic block copolymer is an organic acid or anhydride modified styrene block copolymer selected from the group consisting of poly(styrene-b-(ethylene-co-butylene)-b-styrene, poly(styrene-b-(ethylene-alt-propylene)-b-styrene) and poly(styrene-b-isobutylene-b-styrene). In one embodiment, the hot melt pressure sensitive adhesive composition includes at least one styrenic block copolymer having diblock content. In another embodiment, the peel of the hot melt pressure sensitive adhesive does not decrease when tested according to the Humidity Incubated Peel Test Method. In another embodiment, the hot melt pressure sensitive adhesive composition has a 180° peel to both stainless steel and high density polyethylene (HDPE) of least 5 N/cm when testing according to the 180° Peel Adhesion to HDPE or Stainless Steel Test Method. In a different embodiment, the modified styrenic block copolymer, the styrenic block copolymer, the tackifying agent and the plasticizer make up at least 90% by weight of the hot melt adhesive composition.

In one embodiment, the modified styrenic block copolymer has a radial structure with from 3 to 10 arms, a hydrogenated mid-block, and a styrene content of from 6% by weight to 15% by weight. In another embodiment, the modified styrenic block copolymer has a radial structure with from 3 to 10 arms, a hydrogenated mid-block, and a styrene content of from 25% by weight to 45% by weight.

In another aspect, the invention features an absorbent article including a topsheet, a backsheet, optionally an absorbent core disposed between the topsheet and the backsheet, a garment-facing surface, and a hot melt pressure-sensitive adhesive composition disposed on the garment-facing surface of the absorbent article, the hot melt pressure sensitive adhesive composition including styrene block copolymer, modified styrene block copolymer, tackifying agent, and plasticizer.

The inventors have discovered that the inclusion of modified styrene block copolymer in a composition with limited wax results in hot melt adhesive compositions that have improved adhesion to a variety of substrates under a variety of conditions.

The inventive compositions are particularly useful as a positioning adhesive. A positioning adhesive is used to adhere disposable absorbent articles to various materials including e.g., fabric used for undergarments. This can present challenges as in one aspect, the hot melt adhesive composition needs to adhere to a variety of different fabrics including cotton, microfiber, etc. and in a variety of different environments including high humidity environments such as e.g., when the user is physically active. On the other hand, the disposable absorbent article needs to be easily removed without tearing when the user is ready to dispose of it. Other features and advantages will be apparent from the following description of the preferred embodiments and from the claims.

DETAILED DESCRIPTION

The inventive compositions are hot melt adhesive compositions, or even hot melt pressure sensitive adhesive compositions. Hot melt pressure sensitive adhesive compositions have tack at room temperature.

The invention features a hot melt adhesive composition including from 5% by weight to 40% by weight of a non-modified styrenic block copolymer, from 0.5% by weight to 15% by weight of a modified styrenic block copolymer, from 30% by weight to 65% by weight of a tackifying agent, and from 10% by weight to 45% by weight of a plasticizer, wherein the hot melt adhesive composition comprises less than 5% by weight of a wax.

The invention features a hot melt adhesive composition including from 5% by weight to 40% by weight of a non-modified styrenic block copolymer, from 0.5% by weight to 30% by weight of a modified styrenic block copolymer, from 30% by weight to 65% by weight of a tackifying agent, and from 10% by weight to 45% by weight of a plasticizer, wherein the hot melt adhesive composition comprises less than 5% by weight of a wax.

The invention also features a hot melt adhesive composition including from 10% by weight to 40% by weight of a non-modified styrenic block copolymer, from 0.5% by weight to 15% by weight of a modified styrenic block copolymer, from 30% by weight to 65% by weight of a tackifying agent, and from 10% by weight to 45% by weight of a plasticizer, wherein the hot melt adhesive composition comprises from 0% by weight to less than 4% by weight of a wax.

The invention also features a hot melt adhesive composition including from 10% by weight to 40% by weight of a non-modified styrenic block copolymer, from 0.5% by weight to 30% by weight of a modified styrenic block copolymer, from 30% by weight to 65% by weight of a tackifying agent, and from 10% by weight to 45% by weight of a plasticizer, wherein the hot melt adhesive composition comprises from 0% by weight to less than 4% by weight of a wax.

The invention further features a hot melt pressure sensitive adhesive composition including from 5% by weight to 25% by weight of a non-modified styrene block copolymer, from 1% by weight to 10% by weight of a modified styrenic block copolymer, from 40% by weight to 60% by weight of a hydrogenated hydrocarbon tackifying agent, and from 25% by weight to 43% by weight of an oil, wherein the hot melt adhesive composition comprises less than 5% by weight of a wax.

The invention also features a disposable absorbent article including a topsheet, a backsheet, optionally an absorbent core disposed between the topsheet and the backsheet, a garment-facing surface; and a hot melt pressure-sensitive adhesive composition disposed on the garment-facing surface of the absorbent article, the hot melt pressure sensitive adhesive composition including styrenic block copolymer, modified styrenic block copolymer, tackifying agent, and plasticizer.

The total amount of the non-modified styrenic block copolymer, the modified styrenic block copolymer, the tackifying agent and the plasticizer can make up at least 80% by weight, at least 85% by weight, at least 90% by weight, or even at least 95% by weight of the hot melt adhesive composition.

The hot melt adhesive composition can have a Brookfield Viscosity of no greater than 20,000 centipoise (cP), no greater than 15,000 cP, no greater than 10,000 cP, from 100 cP to 20,000 cP, or even from 100 cP to 15,000 cP at 149° C., or even at 121° C.

When the hot melt adhesive composition is a pressure sensitive adhesive composition it can give a peel that does not decrease when aged under conditions of high humidity as tested according to the Humidity Incubated Peel Test Method.

The hot melt adhesive composition provides strong adhesion to a wide variety of substrates. When the hot melt adhesive composition is a pressure sensitive adhesive composition it can give a 180° peel to both stainless steel and high density polyethylene (HDPE) of least 3 N/cm, or even at least 5 N/cm when tested according to the 180° Peel Adhesion to HDPE or Stainless Steel Test Method.

Styrenic Block Copolymer

The hot melt adhesive composition includes a non-modified styrenic block copolymer (SBC) and a modified SBC.

The non-modified SBC and the modified SBC can include more than one grade of SBC. When more than one SBC is included the styrene content, the diblock content and the melt flow rate ranges specified below are a weight average of the various grades present, including the non modified and modified grades.

As an example, if the hot melt adhesive composition comprises two SBCs A and B. Polymer A is present at 25 weight % (wA) with a styrene content of 15% (sA) and polymer B is present at 25 weight % (wB) with a styrene content of 20 weight % (sB). The average styrene content of the styrenic block copolymer is calculated in the following way:

$$wA/(wA+wB)*sA+wB/(wA+wB)*sB = 0.5(15)+0.5(20) = 17.5 \text{ weight } \%.$$

The SBC can have an average styrene content of from 15% by weight to 45% by weight, from 20% by weight to 45% by weight, from 25% by weight to 45% by weight, from 27% by weight to 43% by weight, from 28% by weight to 42% by weight, or even from 15% to 30% by weight.

The SBC can have an average Melt Flow Rate (MFR) per ASTM D 1238 (200° C./5 kg) in g/10 min of from 3 to 100, from 3 to 40, 5 to 35, or even 5 to 20.

The SBC can have an average diblock content as reported by the supplier of from 0% by weight to 40% by weight, from 0% by weight to 30% by weight, from 0% by weight to 25% by weight, from 5% by weight to 30% by weight, from 8% by weight to 30% by weight, from 10% by weight to 25% by weight, or even from 10% by weight to 23% by weight.

The hot melt adhesive composition can include a total styrenic block copolymer (non-modified and modified) content of from 6% by weight, 8% by weight, 10% by weight, 12% by weight to 20% by weight, 22% by weight, 25% by weight, 30% by weight, 40% by weight, or any two values therebetween.

Non-Modified Styrenic Block Copolymer

The hot melt adhesive composition includes a non-modified styrenic block copolymer (SBC). By non-modified it is meant that the SBC has not been modified/grafted with a functional group capable of participating in hydrogen bonding. The hot melt adhesive composition can include more than one non-modified SBC.

The non-modified SBC has at least one A block that includes styrene and at least one B block that includes, e.g., elastomeric conjugated dienes (e.g., hydrogenated and unhydrogenated conjugated dienes), sesquiterpenes (e.g., hydrogenated and nonhydrogenated sesquiterpenes), and combinations thereof. The A blocks and the B blocks bind to one another in any manner of binding such that the resulting copolymer exhibits a variety of structures including, e.g., random, straight chained, branched, radial, star, comb, tapered, and combinations thereof. The block copolymer can exhibit any form including, e.g., linear A-B block, linear A-B-A block, linear A-(B-A) n-B multi-block, and radial (A-B) n-Y block where Y is a multivalent compound and n is an integer of at least 3, tetrablock copolymer, e.g., A-B-A-B, and pentablock copolymers having a structure of A-B-A-B-A. The adhesive composition can include blends of at least two different block copolymers.

Suitable styrene A blocks include, e.g., styrene, alphamethylstyrene, o-methylstyrene, m-methylstyrene, p-methylstyrene, p-tert-butylstyrene, 2,4-dimethylstyrene, 2,4,6-trimethylstyrene, and combinations thereof.

Suitable block elastomeric conjugated diene B blocks include, e.g., butadiene (e.g., polybutadiene), isoprene (e.g., polyisoprene), 2,3-dimethyl-1,3-butadiene, 1,3-pentadiene, 1,3-hexadiene, and combinations thereof, and hydrogenated versions thereof including, e.g., ethylene, propylene, butylene and combinations thereof. Suitable B block sesquiterpenes include, e.g., beta farnesene. The non-modified styrenic block copolymer can have an unsaturated mid-block, alternately the mid-block can be saturated i.e., hydrogenated.

In addition to elastomeric conjugated diene B blocks, styrene monomer can be distributed in the mid-block.

Useful non-modified SBCs include, e.g., poly(styrene-b-butadiene) (SB), poly(styrene-b-butadiene-b-styrene) (SBS), poly(styrene-b-isoprene) (SI), poly(styrene-b-isoprene-b-styrene) (SIS), poly(styrene-b-(ethylene-co-butylene)-b-styrene) (SEBS), poly(styrene-b-(ethylene-alt-propylene)-b-styrene) (SEPS), poly(styrene-b-isobutylene-b-styrene) (SIBS), poly(styrene-b-(ethylene-co-butylene-co-styrene)-b-styrene) (SEBSS) and combinations thereof.

Preferred non-modified SBCs include poly(styrene-b-isoprene-b-styrene) (SIS), poly(styrene-(ethylene-co-butylene)-b-styrene) (SEBS), poly(styrene-b-(ethylene-alt-propylene)-b-styrene) (SEPS), poly(styrene-b-isobutylene-b-styrene) (SIBS) and combinations thereof.

The non-modified SBC can have a styrene content of from 6% by weight, 8% by weight, 10% by weight, 12% by weight, 15% by weight, 17% by weight, 20% by weight to 25% by weight, 30% by weight, 35% by weight, 40% by weight, 45% by weight or any two values therebetween.

Useful non-modified block copolymers are commercially available under the KRATON D, including KRATON D 1118 and KRATON G series of trade designations from Kraton Corporation, from (Houston, Texas) including, the VECTOR series of trade designations from Taiwan Synthetic Rubber Corporation (TSRC) (Taipei City, Taiwan) including VECTOR, and the GLOBALPRENE series of trade designations from LCY Grit Corp (Taiwan) including GLOBALPRENE 3546.

The hot melt adhesive composition includes from 5% by weight to 40% by weight, from 10% by weight to 40% by weight, from 10% by weight to 35% by weight, from 10% by weight to 30% by weight, from 12% by weight to 28% by weight, from 5% by weight to 25% by weight, from 8% by weight to 25% by weight, from 10% by weight to 25% by weight, from 8% by weight to 20% by weight, or even from 5% by weight to 15% by weight of a non-modified styrenic block copolymer.

Modified Styrenic Block Copolymer

The hot melt adhesive composition includes a modified SBC. The modified SBC included in the hot melt adhesive composition is an SBC modified (more preferably grafted) with a functional group capable of participating in hydrogen bonding (e.g., organic acid (e.g. carboxylic acid), anhydride, amide, amine, urea, carbamate, hydroxyl, carbonate, ketone, alkoxysilane, etc.). The final SBC may or may not contain saturation in the polymer backbone. Such modified styrenic block copolymers may be prepared by conventional methods known in the art.

Useful modified SBC polymers include modified versions of those described above in the non-modified styrenic block copolymer section including, e.g., poly(styrene-b-butadiene) (SB), poly(styrene-b-butadiene-b-styrene) (SBS), poly (styrene-b-isoprene) (SI), poly(styrene-b-isoprene-b-styrene) (SIS), poly(styrene-b-(ethylene-co-butylene)-b-styrene) (SEBS), poly(styrene-b-(ethylene-alt-propylene)-b-styrene) (SEPS), poly(styrene-b-isobutylene-b-styrene) (SIBS), poly(styrene-b-(ethylene-co-butylene-co-styrene)-b-styrene) (SEBSS) and combinations thereof. Preferred modified styrenic block copolymers include modified poly (styrene-b-isoprene-b-styrene) (SIS), poly(styrene-(ethylene-co-butylene)-b-styrene) (SEBS), poly(styrene-b-(ethylene-alt-propylene)-b-styrene) (SEPS), poly(styrene-b-isobutylene-b-styrene) (SIBS) and combinations thereof.

The modified SBC polymer can have a structure selected from the group consisting of linear, branched, radial, and combinations thereof. When the modified SBC polymer has a radial structure, it can have 3 to 10 arms, 3 to 8 arms, or even 3 to 6 arms.

One preferred modified SBC is a maleic anhydride grafted SBC having a bound maleic anhydride content of from 0.5% by weight to 5% by weight, 0.7% by weight to 3% by weight or even from 1.0% by weight to 2.5% by weight.

The modified SBC polymer can have a styrene content of from 6% by weight, 8% by weight, 10% by weight, 12% by weight, 15% by weight, 17% by weight, 20% by weight to 25% by weight, 30% by weight, 35% by weight, 40% by weight, 45% by weight or any two values therebetween. The modified SBC polymer can have a styrene content of from 6% by weight to 15% by weight. Alternatively, the modified SBC polymer can have a styrene content of from 25% by weight to 45% by weight.

In one embodiment, the modified SBC can have a radial structure with from 3 to 10 arms, having a hydrogenated mid-block, and a styrene content of from 6% by weight to 15% by weight. Alternatively, the modified SBC can have a radial structure with from 3 to 10 arms, having a hydrogenated mid-block, and a styrene content of form 25% by weight to 45% by weight.

In one embodiment, the modified SBC can be a maleic anhydride grafted SBC having a bound maleic anhydride content of from 0.5% by weight to 5% by weight, a radial structure with from 3 to 10 arms, having a hydrogenated mid-block, and a styrene content of from 6% by weight to 15% by weight. Alternatively, the modified SBC can be a maleic anhydride grafted SBC having a bound maleic anhydride content of from 0.5% by weight to 5% by weight, having a radial structure with from 3 to 10 arms, having a hydrogenated mid-block, and a styrene content of form 25% by weight to 45% by weight.

Useful commercially available modified styrene block copolymers are available under the KRATON designation including KRATON FG1901 and FG1924, both maleic anhydride modified SEBS polymers available from Kraton Corporation (Houston, Texas), under the TAIPOL designation including TAIPOL SEBS 7126 and TAIPOL SEBS 7131, both maleic anhydride modified SEBS polymers available from TSRC Corporation (Kaohsiung City, Taiwan) and under the TUFTEC designation including TUFTEC M1943, TUFTEC M1911, TUFTEC M1913—all maleic anhydride modified and TUFTEC MP110—amine modified, all available from the Asahi Kasei Chemical company (Japan).

The hot melt adhesive composition includes from 0.5% by weight to 30% by weight, from 2% by weight to 30% by weight, 0.5% by weight to 25% by weight, from 0.5% by weight to 20% by weight, from 2% by weight to 20% by weight, 0.5% by weight to 15% by weight, from 1% by weight to 15% by weight, from 1% by weight to 13% by weight, or even from 2% by weight to 10% by weight of a modified SBC

Tackifying Agent

The hot melt adhesive composition can include one or more tackifying agents.

The tackifying agent can function to tackify the mid-block of the SBC or to reinforce the end block of the SBC. The tackifying agent can be fluid or solid at room temperature. Suitable classes of tackifying agents include, e.g., aromatic, aliphatic and cycloaliphatic hydrocarbon resins, mixed aromatic and aliphatic modified hydrocarbon resins, aromatic modified aliphatic hydrocarbon resins, and hydrogenated versions thereof; terpenes, modified terpenes and hydrogenated versions thereof; natural rosins, modified rosins, rosin esters, and hydrogenated versions thereof; low molecular weight polylactic acid; and combinations thereof.

The tackifying agent can have an average Ring and Ball softening point of from 90° C. to 130° C., 95° C. to 120° C., or even 100° C. to 115° C.

The tackifying agent can be a hydrogenated hydrocarbon tackifying agent.

The hot melt adhesive compositions of this invention can be free of non-hydrogenated tackifying agents (e.g., non-hydrogenated C5 resins). Non-hydrogenated tackifying agents have been found to increase the color, odor, and increase the degradation at high temperature of the hot melt adhesive composition. Hydrogenated hydrocarbon tackifying agents are lower in odor and color and have been shown to have improved heat stability.

Suitable classes of hydrogenated hydrocarbon tackifying agents include, e.g., aromatic, aliphatic and cycloaliphatic hydrocarbon resins, aromatic modified aliphatic or cycloaliphatic hydrocarbon resins, terpenes, modified terpenes and combinations thereof. Examples of useful aliphatic and cycloaliphatic petroleum hydrocarbon resins include aliphatic and cycloaliphatic petroleum hydrocarbon resins include, e.g., branched and unbranched C9 resins and C10 resins. Examples of useful polyterpene resins include polyterpene resins, and copolymers and terpolymers of natural terpenes (e.g., styrene-terpene, alpha-methyl styrene-terpene and vinyl toluene-terpene).

Preferred classes of hydrogenated hydrocarbon tackifying agents include hydrogenated hydrocarbon resins having aromatic content. Hydrogenated hydrocarbon resins having aromatic content can be selected from the group consisting of aromatic modified hydrocarbon resin and aromatic hydrocarbon resin.

Useful tackifying resins include those available under the ESCOREZ trade designation from ExxonMobil Chemical Company including ESCOREZ 5600 (Molecular Weight–Weight Average (Mw)=800 g/mole, 9.8% aromatic content), ESCOREZ 5690 (10% aromatic content), ESCOREZ 5615 (9.9% aromatic content), ESCOREZ 5637 (5% aromatic content) and ESCOREZ 5400 (0% aromatic content, Mw=670 g/mole), and the EASTOTAC series of trade designations from Eastman Chemical (Kingsport, Tennessee) including, e.g., EASTOTAC H-100R and H-100L. Useful hydrogenated aromatic hydrocarbon resins include KRISTALEX and PLASTOLYN series of trade designations from Eastman Chemical Company (Kingsport, Tenn.) including, e.g., KRISTALEX 3100, PLASTOLYN 240 (Mw=4060, 55% aromatic content) and PLASTOLYN 290 (Mw=4760).

The hot melt adhesive composition includes from 20% by weight to 70% by weight, from 30% by weight to 65% by weight, from about 35% by weight to 60% by weight, or even from 40% by weight to 60% by weight hydrogenated hydrocarbon tackifying agent.

Plasticizer

The plasticizer can be a liquid at room temperature. The hot melt adhesive composition can include more than one plasticizer.

Useful plasticizers include, e.g., polybutene, polyisobutylene, polyolefin copolymers (e.g., propylene-ethylene copolymers), oligomerized alpha olefins, oils (e.g., naphthenic petroleum-based oils, paraffinic oils, mineral oils, animal oils, vegetable oils, synthetic oils, derivatives of oils, liquid isoprene, glycerol esters of fatty acids, and combinations thereof), and combinations thereof.

Useful commercially available plasticizers include, e.g., plasticizers sold under the NYFLEX series of trade designations from Nynas Corporation (Houston, Texas) including, e.g., NYFLEX 222B and NYFLEX 223, KAYDOL OIL from Sonneborn, LLC (Parsippany, New Jersey), KRYSTOL 550 mineral oil from Petrochem Carless Limited (Surrey, England), and CALSOL 5550 oil from Calumet Specialty Products Partners, LP (Indianapolis, Indiana).

The composition includes from 5% by weight to 50% by weight, from 10% by weight to 50% by weight, from 15% by weight to 45% by weight, from 20% by weight to 45% by weight, or even from 30% by weight to 42% by weight of a plasticizer.

Wax

The hot melt adhesive composition can be free of a wax, alternatively the hot melt adhesive composition can include a limited amount of wax. Useful classes of wax include, e.g., paraffin waxes, microcrystalline waxes, high density low molecular weight polyethylene waxes, by-product polyethylene waxes, polypropylene waxes, Fischer-Tropsch waxes, oxidized Fischer-Tropsch waxes, functionalized waxes such as acid, anhydride, and hydroxyl modified waxes, animal waxes, vegetable waxes (e.g., soy wax) and combinations thereof. Useful waxes are solid at room temperature and preferably have a Ring and Ball softening point of from 50° C. to 170° C. The wax can be a propylene based wax with a Mettler Softening Point (ASTM D 6092) of greater than 130° C., greater than 140° C., or even greater than 150° C.

Useful waxes are commercially available from a variety of suppliers including EPOLENE N and C series of trade designations from Westlake Chemical Corporation (Houston, Texas) including e.g., EPOLENE N-21, EPOLENE N-15 and EPOLENE C-13, the LICOCENE series of trade designations from Clariant International Ltd. (Muttenz, Switzerland) including e.g., LICOCENE PP 6102, LICOCENE PP 6502 TP, LICOCENE PP 7502 TP and LICOCENE PE MA 4315 and the VISCOWAX series of trade designations from Innospec Leuna GmGH (Leuna, Germany) including e.g. VISCOWAX 116.

The hot melt adhesive composition includes less than 5% by weight, less than 4.5% by weight, less than 4% by weight, less than 3.5% by weight, less than 3% by weight, less than 2% by weight, from 0% by weight to 4.5% by weight, from 0% by weight to 4% by weight, from 0% by weight to 3.5% by weight, from 0% by weight to 3%.

Optional Components

The composition can optionally include a variety of additional components including, e.g., fillers, super absorbents, surfactants, flame retardants, additional polymers (e.g., olefin polymers), and various additives (e.g., coextrusion coatings, packaging film, stabilizers, antioxidants, adhesion promoters, ultraviolet light stabilizers, rheology modifiers, biocides, corrosion inhibitors, dehydrators, colorants (e.g., pigments and dyes), optical brighteners, and combinations thereof).

Useful antioxidants include, e.g., pentaerythritol tetrakis [3,(3,5-di-tert-butyl-4-hydroxyphenyl)propionate], 2,2'-methylene bis(4-methyl-6-tert-butylphenol), phosphites including, e.g., tris-(p-nonylphenyl)-phosphite (TNPP) and bis(2,4-di-tert-butylphenyl) 4,4'-diphenylene-diphosphonite, di-stearyl-3,3'-thiodipropionate (DSTDP), and combinations thereof. Useful antioxidants are commercially available under a variety of trade designations including, e.g., the IRGANOX series of trade designations including, e.g., IRGANOX 1010, IRGANOX 565, and IRGANOX 1076 hindered phenolic antioxidants and IRGAFOS 168 phosphite antioxidant, all of which are available from BASF Corporation (Florham Park, New Jersey), and ETHYL 702 4,4'-methylene bis(2,6-di-tert-butylphenol), and the BNX series of trade designations including, e.g., BNX 1010 and BNX 1076 from Mayzo, Inc. (Suwanee, Georgia). When present, the adhesive composition preferably includes from about 0.1% by weight to about 2% by weight antioxidant.

Uses

The hot melt adhesive composition is useful in a variety of applications and constructions including, e.g., disposable absorbent articles including, e.g., disposable diapers, adult incontinence products, sanitary napkins, medical dressings (e.g., wound care products), bandages, surgical pads, pet training pads (e.g. puppy pads) and meat-packing products, and components of absorbent articles including, e.g., an absorbent element, absorbent cores, impermeable layers (e.g., backsheets), tissue (e.g., wrapping tissue), acquisition layers and woven and nonwoven web layers (e.g., top sheets, absorbent tissue).

The hot melt adhesive composition also can be applied to a variety of substrates including, e.g., films (e.g., polyolefin (e.g., polyethylene and polypropylene), polyester, metallized polymer, multilayer, biaxially oriented, monoaxially oriented, ethylene-vinyl acetate copolymer, polyurethane, vinyl, polyvinylidene fluoride, cellulose acetate and ethyl cellulose, and polyamide films, and combinations thereof), metal foils, release liners, porous substrates, cellulose substrates, sheets (e.g., paper and fiber sheets), paper products, woven and nonwoven webs, fibers (e.g., natural cellulose fibers such as wood pulp, cotton, silk and wool; cellulosic fibers; synthetic polymer fibers such as nylon, rayon, polyesters, acrylics, polypropylenes, polyethylene, polyvinyl chloride, and polyurethane; glass fibers; recycled fibers; and various combinations thereof), and tape backings. Useful substrates include, e.g., single layer, multilayer, treated (e.g., corona treated or chemically primed), and untreated substrates, and combinations thereof.

Applications within a Disposable Absorbent Article

Positioning

Hot melt pressure-sensitive adhesive compositions of this invention are useful as a positioning adhesive disposed on at least one substrate surface of a disposable absorbent article and can be used to position an absorbent article on a garment such as underwear. Such disposable absorbent articles include, e.g., feminine hygiene articles such as sanitary napkins and panty liners, diapers, disposable garments having a waist opening and leg openings, and adult incontinence articles.

In one construction, the disposable absorbent article (e.g., a feminine hygiene article) includes a garment facing surface and a body facing surface, a topsheet having a garment facing surface and a body facing surface, a backsheet having a garment facing surface and a body facing surface, and optionally an absorbent core disposed between the body facing surface of the backsheet and the garment facing surface of the topsheet. The absorbent core can be optional as for absorbent articles having limited absorption, a specific top sheet e.g., high lofted top sheet can also serve as the absorbent portion of the article.

The top sheet defines a body-facing surface of the absorbent article. The absorbent core is positioned inwardly from the outer periphery of the absorbent article. The absorbent structure includes a body-facing surface and a garment-facing surface positioned adjacent the backsheet. The positioning adhesive composition is disposed between a release liner and the backsheet, which is permanently adhered to the absorbent core through a permanent adhesive composition. The top sheet is permanently adhered to the absorbent core through a discontinuous permanent adhesive composition. The top sheet and the backsheet are joined together and the sealed edges of the top sheet and the backsheet define an overall sealed peripheral edge of the article. The absorbent article can be of any suitable shape and size.

The top sheet is designed to contact the body of the user and is liquid permeable. The exposed surface of the liquid permeable top sheet is designed to receive aqueous fluids from the body, which fluids will then be directed away from the body of the user and toward the absorbent core. The top sheet is constructed of any suitable material that is easily penetrated by bodily exudates. The top sheet optionally includes a plurality of apertures formed therethrough to permit body fluid to pass more readily into the absorbent core. The backsheet is liquid-impermeable and designed to face the inner surface, i.e., the crotch portion of the garment (e.g., underwear) of a user. The backsheet optionally is constructed to permit a passage of air or vapor out of the absorbent article (e.g., a vapor permeable layer), while still blocking the passage of liquids.

The hot melt pressure-sensitive adhesive composition is disposed on the garment facing surface of the adsorbent article, in general, or even on the garment facing surface of the backsheet. A release liner optionally is disposed on the pressure-sensitive hot melt adhesive composition to protect the pressure-sensitive adhesive composition until use. The absorbent article (e.g., a feminine hygiene article) optionally includes additional layers and adhesives and the components of the absorbent article optionally exhibit additional functionality. Examples of additional layers, functionality and combinations thereof include dusting, wicking, acquisition, additional top sheets, multiple core layers, superabsorbent particles and compositions, wetness indicators, and combinations thereof.

Two common fabrics used today, that positioning adhesives need to bond to, are cotton and microfiber. Cotton fabric refers to a woven fabric made with 100% cotton fiber. Microfiber is a fabric created with synthetic fibers having a diameter of less than ten micrometers that are tightly woven. Multiple chemistries (often polar materials e.g. polyester, polyamides, etc.) can be used to create the microfiber fabrics.

Core Stabilization

The hot melt adhesive compositions of this invention can be used to contain, immobilize and/or provide strength to the absorbent core of a disposable absorbent article (i.e., core stabilization).

The absorbent core includes the core and optionally a core wrap. The absorbent core can be manufactured in-line (i.e., in the disposable absorbent article) assembly line. Alternatively, the core can be manufactured off-line and then rolled up or festooned for use at a later date or a different location. The core can vary in design, shape, and in the materials used. It can be shaped like a long rectangle or like a dog bone. It can be one continuous shape or can be broken into channels formed by for example the top sheet and the back sheet. The core is generally centered within the article and is firmly secured between the top sheet and back sheet through an attachment means (e.g., an adhesive).

The core includes absorbent materials capable of absorbing bodily fluids and solids received through the top sheet. The core can include cellulose fibers (i.e. fluff), wood pulp, cotton, synthetic fibers, nonwoven, tissue, foam, superabsorbent polymers (e.g. polyacrylates) or any other absorbent material.

The absorbent core can comprise less than 10% by weight fluff, or even be entirely fluff free. In a low fluff or fluff free core, the absorbent core comprises the hot melt adhesive composition and superabsorbent polymer and optionally layers of nonwoven and/or tissue. The core can be a composite core. A composite core can comprise less than 10% by weight fluff, or even be entirely fluff free. A composite core includes more than one layer of SAP alternating with layers of nonwoven or tissue and the hot melt adhesive composition. The composite core can include from 1 to 5, or even from 2 to 4 individual layers of SAP, alternating with hot melt adhesive composition and nonwoven or tissue.

The core wrap can be any material that wraps around the core to hold the components of the core in place. The core wrap generally wraps around the two longer sides of the core, leaving the ends open. The core wrap can be selected from the group consisting of nonwoven and tissue.

The hot melt adhesive composition can be used to hold the absorbent materials in place in both the dry (unexpanded state) and wet (swollen state).

The absorbent core can be used in a variety of disposable absorbent articles including, e.g., disposable diapers, adult incontinence products, sanitary napkins, medical dressings (e.g., wound care products), bandages, surgical pads, pet training pads (e.g. puppy pads) and meat-packing products.

Construction

The hot melt adhesive composition can further be used for construction applications. In a typical construction application in the manufacture of a disposable absorbent article, a body fluid impermeable backsheet is bonded to a nonwoven substrate. In other construction applications, a nonwoven substrate is bonded to a nonwoven substrate. The hot melt adhesive composition may also be used to bond at least one additional layer or material selected from the group consisting of absorbents, tissues, elastomeric materials, superabsorbent polymers, and combinations thereof. For example, the hot melt adhesive composition can further be used for back sheet lamination i.e., where the body fluid impermeable backsheet typically a polyolefin film (e.g., polyethylene, polypropylene, ethylene vinyl acetate, ethylene copolymer, etc.) is bonded to a second nonwoven to improve the feel of the disposable article.

Elastic Attachment

The hot melt adhesive composition can be used for elastic attachment applications, which include bonding elastic material (e.g., strands, film, etc.) to a component of the disposable absorbent article. The elastic material can be coated with the hot melt adhesive composition while in a stretched form and then bonded to a film (e.g., polyethylene, polypropylene, etc.) or a nonwoven substrate. The elastic material coated with the hot melt adhesive composition can also be bonded between two such substrates. This process results in creep resistant gathers once the tension is removed.

The adhesive can alternatively be applied to the film or nonwoven substrate and then the elastic material bonded to it. The hot melt adhesive can be used as an elastic attachment adhesive in forming the ear/tab of the disposable absorbent article. Alternatively, the hot melt adhesive can further be used as an elastic attachment adhesive to help elasticize either the leg holes or the waist of the disposable absorbent article.

Additional Applications

In addition to various applications within a disposable absorbent article, the hot adhesive compositions of this invention can also be used for stick to skin applications (e.g., medical tapes and bandages, wearable devices (e.g., colostomy bags), athletic and kinesiology tapes, wound dressings, etc.), as an adhesive on various tapes and to adhere labels to various items including e.g., containers, and for any application in which adhesion to dissimilar substrates is required.

The hot melt adhesive composition is useful in a variety of forms including, e.g., as a coating (e.g., continuous and discontinuous (e.g., random, pattern, array, spiral, dots, spots, and combinations thereof) coatings), film (e.g., continuous films and discontinuous films), bead, sheet, fiber, filament, web (e.g., woven and nonwoven), and combinations thereof.

Various application techniques can be used to apply the adhesive composition to a substrate including, e.g., slot coating, spraying (e.g., spiral spraying and random spraying), screen printing, foaming, engraved roller, extrusion, meltblown adhesive application techniques, and combinations thereof.

The invention will now be described by way of the following examples.

EXAMPLES

Test Procedures

Test procedures include the following. All ratios and percentages are by weight unless otherwise indicated. The procedures are conducted at room temperature (i.e., an ambient temperature of from about 20° C. to about 25° C.) unless otherwise specified. The properties set forth for the components used in the compositions are as reported by the manufacturer unless otherwise specified.

Brookfield Viscosity Test Method

Brookfield Viscosity is determined in accordance with ASTM D-3236 entitled, "Standard Test Method for Apparent viscosity of Hot Melt Adhesives and Coating Materials," (Oct. 31, 1988), using a Brookfield Thermosel viscometer Model RVDV 2, and a number 27 spindle. The results are reported in centipoise (cP) and the test is performed at the specified temperature.

Test Sample Preparation Method for Peel Force to Cotton and Microfiber

A laminate is prepared by coating a sample composition onto a silicone coated release paper in a one inch wide pattern at an add-on weight of 20 grams per square meter ($g/m^2$) (+/−3 $g/m^2$) using a slot applicator and then contacting the adhesive strip with the treated side of a 1 mil (0.025 mm) thick polyethylene film to form a silicone coated release paper/adhesive/polyethylene film laminate. Test samples having a length of 4 inches (in) (10.16 cm) in the machine direction and 1.5 in (3.81 cm) in the cross-machine direction are then cut from the laminate such that the adhesive pattern is centered in the cross-machine direction of the test sample.

For cotton bonds a sheet of 124 $g/m^2$ bleached t-shirt cotton fabric (Testfabrics, Inc., West Pittston, Pennsylvania) is cut into strips having a length of 4 inch (in) (10.16 cm) in the machine direction and a width of 1.5 in (3.81 cm) in the cross-machine, before cutting the cotton fabric, the grid work of the stitching of the fabric is examined. When the cotton fabric is stretched, the sample will exhibit greater elongation in one direction than in another direction. The cotton fabric is cut lengthwise in the direction that has less elongation. All cotton fabric strips are cut as straight as possible along the stitching grid work. If the cotton fabric strips are cut askew, an inconsistent elongation of the cotton fabric test sample will result.

The release film is removed from the adhesive and the adhesive side of each test sample is gently placed on the surface of a cotton strip such that the cotton curls up (in the lengthwise direction) toward the adhesive bond to form the composite test sample. In preparing the composite test sample, the adhesive is not pressed down onto the cotton fabric.

For the microfiber bonds a sheet of LUCERO polymeric microfiber made from 70% polyamide and 30% elastomer having a target weight of 135 g/m2 (Termileniao S.A.). Before testing the fabric is first washed without detergent and then cut into 2 in (5.08 cm) by 8 in (20.32 cm) strips with the long edge going along the lines of the fabric to avoid stretching.

Care is taken to cut each 8-in (20.32 cm) strip in half creating two 4-in (10.16 cm) long strips. Then one of these strips is turned over to reveal the other face of the fabric. An adhesive sample is placed on each of the 4 in (10.16 cm) strips ensuring an equal number of bonded samples are made to each face of the fabric.

Cotton and Microfiber Peel Force Test Method

At least five samples are prepared according to the Peel Force Sample Preparation Method. The test sample is placed on a 2-kg mechanical roll-down device and the roller is allowed to pass over the film side of the sample two times, once in the forward direction and once in the backward direction, at a rate of 305 mm/min. A timer is then activated and the sample is placed into the jaws of INSTRON-type peel tester. The polyethylene film is placed into the moving jaw, and the fabric is attached to the stationary jaw. Within one minute after the sample has been removed from the roll-down device, the sample is tested according to ASTM D1876-01 entitled, "Test Method for Determining Peel Resistance of Adhesive (T-Peel Test Method)," with the exception that the test is run at a rate of 305 mm/min, instead of 250 mm/min, over a period of ten seconds, and at least five replicates are run instead of the ten specified in ASTM D1876. The average peel force over ten seconds of peeling is recorded, and the results are reported in newtons/cm.

The peel force is measured 24 hours after the test sample is prepared.

Humidity Incubated Peel Test Method

Fabric laminates were prepared according to the above test method. The laminates were incubated in a Thermotron oven at 40° C. and 90% relative humidity for 2 hours. Peel testing (305 mm/min) was performed on each laminate within 10 minutes upon removal from the Thermotron.

180° Peel Adhesion to HDPE or Stainless Steel Sample Preparation

This test method is used to test determine the 180° peel adhesion value of a PSA (including Semi PSA and Ultra Removable PSA) to a high density polyethylene (HDPE) or stainless steel panel. Sample laminates are prepared using a benchtop roll-to-roll laminator. The adhesive was applied at 149° C. using a slot applicator onto untreated PET (Mylar) film using a 2 mil (0.051 mm) shim and bonded to release-treated PET (Mylar) film to form the laminate. The laminates are cut into 1 in×8 in strips (25 mm×200 mm) in the machine direction. HDPE or stainless steel test panels were cleaned with toluene and isopropyl alcohol. The release PET liner is removed. Three samples are laid lengthwise onto the HDPE or stainless steel panels so that 5 in (125 mm) of the adhesive strip is contacting the panel. The sample is rolled down three times in the forward and reverse directions with a 2 kg roller such that there are no air bubbles or creases present. Samples are allowed to condition for one minute prior to peel testing.

180° Peel Adhesion to HDPE or Stainless Steel Test Method

180° Peel adhesion is measured using an INSTRON-type peel tester. The HDPE or stainless steel plate is clamped in the bottom jaws so that the "free tab" of the sample is facing downward. The top jaws of the INSTRON (attached to the load cell) is used to secure the free tab of the sample. Peel force (N) is measured with the crosshead moving at a rate of 305 mm/min according to PSTC 101 entitled "Peel Adhesion of Pressure Sensitive Tape." Values presented are an average of at least three replicates.

Loop Tack Strength to HDPE or Stainless Steel Sample Preparation

Laminates are coated and prepared according to the same method outlined above for "180° Peel Adhesion to HDPE or Stainless Steel Sample Preparation." Laminates are cut into 5-inch (125 mm) test strips in the machine direction. Test panels (HDPE or stainless steel) are cleaned with toluene and isopropyl alcohol.

Loop Tack Strength to HDPE or Stainless Steel Test Method

Loop tack strength is measured using an INSTRON-type peel tester with a clamping jaw attached to the load cell on the upper crosshead and a loop tack fixture attached to base. The HDPE or stainless steel plate is clamped in the loop tack fixture such that it lays flat. The backing of the test laminate is removed, and the loop is prepared by stapling a piece of paper between ends of the loop with the adhesive facing outward. The stapled end of the loop is fitted into the top jaws of the INSTRON. The sample is lowered onto the HDPE or stainless steel plate until a full 1 in×1 in (25 mm×25 mm) area of the test plate is fully covered by the exposed adhesive. To measure the loop tack value, the crosshead is moved upward at a rate of 305 mm/min, and the peak force is recorded in N. Values presented are an average of at least three replicates.

Test Sample Preparation Method for "Core" Peel Force to Nonwovens, Cotton, and Cellulosic Towel Substrates A laminate is prepared by coating a sample composition onto an 8 grams per square meter (g/m$^2$) rolled hydrophilic nonwoven (Avgol Americas, Mocksville, NC) in a three-inch-wide pattern (7.62 cm) at an add-on weight of 5 g/m$^2$ (+/−0.5 g/m$^2$) using a slot applicator. The adhesive strip then makes contact with one of three substrates: 1) An identical hydrophilic nonwoven, bonded as the second rolled substrate; 2) a sheet of 124 g/m$^2$ bleached t-shirt cotton fabric (Testfabrics, Inc., West Pittston, Pennsylvania) having a length of 20 inch (in) (50.8 cm) in the machine direction and a width of 8 in (20.3 cm) in the cross-machine direction. This sheet of cotton contacts the adhesive strip and is sandwiched between another layer of nonwoven; 3) A sturdy cellulosic towel (Wypall, Kimberly-Clark, Irving, Texas) is cut into squares having a length and width of 6 inch (15.2 cm). This cellulosic towel contacts the adhesive strip and is sandwiched between another layer of nonwoven. The web speed of the hydrophilic nonwoven is 525 ft/min (160 m/min). Laminates are not subjected to nip compression but are subjected to tension over two "s-wrap" pack rollers. The web tension held on each substrate was 0.25 pounds per linear inch (PLI, or 44 N/m).

Laminates for peel testing were prepared in two ways: 1) Nonwoven-nonwoven laminates were cut in the cross-machine direction so that the machine-direction adhesive strip (3 inch wide) was approximately 5 inch (in) long. Paper flags were thrown perpendicularly onto the web during the coating process to ensure a clean start to the peel test. Nonwoven-cotton and nonwoven-cellulosic towel laminates were cut in the cross-machine direction using a precision cutter to a width of 1.5 inch (in) and an adhesive length of 3 inch (in).

Test Sample Preparation Method for Backsheet Lamination to Nonwoven and Poly Film A laminate is prepared by coating a sample composition onto a hydrophobic nonwoven (5 in wide, 14 gsm basis weight, Unipro) with a pattern width of 3 inch (7.6 cm) at an add-on weight of 3 grams per square meter (g/m$^2$) (+/−0.25 g/m$^2$) using a slot applicator and then contacting the adhesive strip with a corona-treated non-breathable polyethylene film (6 inch/15.24 cm wide, 18 gsm, Berry Global, Evansville, IN) The web speed is 525 ft/min (160 m/min). Laminates are not subjected to nip compression but are subjected to tension over two "s-wrap" pack rollers. The web tension held on each substrate was 0.25 pounds per linear inch (PLI, or 44 N/m).

Laminates for peel testing were prepared such that the machine-direction adhesive strip (3 inch wide) was approximately 6 inch (in) long. Paper flags were thrown onto the web during the coating process to ensure a clean start to the peel test.

Hydrophilic Nonwoven, Cotton, and Cellulosic Towel "Core" Dry Peel Force Test Method At least 8 nonwoven-nonwoven laminate samples are prepared according to the specified method (4 samples up the web in the machine direction from the flag, 4 samples down the web). The sample is placed into the jaws of INSTRON-type peel tester. The "bond-to side" of each laminate (hydrophilic nonwoven, cotton, or cellulosic towel) is placed into the moving jaw, and the "coat-to side" of each laminate (hydrophilic nonwoven) is attached to the stationary jaw. The sample is tested according to ASTM D1876-01 entitled, "Test Method for Determining Peel Resistance of Adhesive (T-Peel Test Method)," with the exception that the test is run at a rate of 305 mm/min, instead of 250 mm/min, over a period of ten seconds, and at least eight replicates are run instead of the ten specified in ASTM D1876. The average peel force over ten seconds of peeling is recorded, and the results are reported in Newtons/cm (N/cm). The above test method was used to measure the peel force for the nonwoven-cotton nonwoven-cellulosic towel laminates, with the exception that five replicates of each type were run instead of the ten specified in ASTM D1876.

The dry peel force is measured 24 hours after the test laminate is prepared.

Hydrophilic Nonwoven, Cotton, and Cellulosic Towel "Core" Wet Peel Force Test Method At least 8 nonwoven-nonwoven samples are prepared according to the specified method (4 samples up the web in the machine direction from the flag, 4 samples down the web). Each laminate is completely submerged in a 0.9% wt/wt saline solution for 3 minutes. Each laminate is then placed on a drying rack (not stacked) to drip dry for 5 minutes before measuring peel force. A timer is then activated, and the sample is placed into the jaws of INSTRON-type peel tester. Each laminate is peel tested within 5 minutes of completing the drip drying step. The "bond-to side" of each laminate (hydrophilic nonwoven, cotton, or cellulosic towel) is placed into the moving jaw, and the "coat-to side" of each laminate (hydrophilic nonwoven) is attached to the stationary jaw. The sample is tested according to ASTM D1876-01 entitled, "Test Method for Determining Peel Resistance of Adhesive (T-Peel Test Method)," with the exception that the test is run at a rate of 305 mm/min, instead of 250 mm/min, over a period of ten seconds, and at least eight replicates are run instead of the ten specified in ASTM D1876. The average peel force over ten seconds of peeling is recorded, and the results are reported in Newtons/cm. The above test method was used to measure the peel force for the nonwoven-cotton nonwoven-cellulosic towel laminates, with the exception that five replicates of each type were run instead of the ten specified in ASTM D1876.

The wet peel force is measured 24 hours after the test laminate is prepared.

Nonwoven-Polyethylene Film "Backsheet Lamination" Peel Force Test Method

At least 8 nonwoven-poly film samples are prepared according to the specified method (4 samples up the web in the machine direction from the flag, 4 samples down the web). The sample is placed into the jaws of INSTRON-type peel tester. The "bond-to side" (polyethylene film) of each laminate is placed into the moving jaw, and the "coat-to side" of each laminate (hydrophobic nonwoven) is attached to the stationary jaw. The sample is tested according to ASTM D1876-01 entitled, "Test Method for Determining Peel Resistance of Adhesive (T-Peel Test Method)," with the exception that the test is run at a rate of 305 mm/min, instead of 250 mm/min, over a period of ten seconds, and at least eight replicates are run instead of the ten specified in ASTM D1876. The average peel force over ten seconds of peeling is recorded, and the results are reported in Newtons/cm.

The initial dry peel force is measured 24 hours after the test laminates are prepared. Aged peel force is measured after subjecting an identical set of laminates to accelerated aging at 49° C. for 28 days. Aged laminates are then conditioned in a room adhering to ASTM D1876 for a minimum of 1 hour before peel testing is performed.

The adhesive compositions were prepared by combining and mixing the components under nitrogen in the amounts set forth in Table 1 and Table 2 in a sigma blade mixer operating at 177° C. The adhesive compositions were then tested according to various test methods. These results are reported in Table 1 and Table 2 below.

TABLE 1

Control 1 is an SBC based positioning adhesive that does not include a modified SBC.

| | Control 1 | Ex 1 | Ex 2 | Ex 3 | Ex 4 | Ex 5 | Ex 6 | Ex 7 | Ex 8 |
|---|---|---|---|---|---|---|---|---|---|
| GLOBALPRENE 3546 | | 13 | 12 | 8 | 11 | 8 | 8 | 8 | 5 |
| KRATON D1118 | | | | | | | | 4 | 5 |
| TAIPOL 7126 | | 4 | 5 | 5 | 4 | 5 | 4 | 3 | 5 |
| ESCOREZ 5400 | | 52.5 | 52.5 | 52.5 | 53.5 | 49.5 | 50.5 | | |
| ESCOREZ 5637 | | | | | | | | 47 | 49 |
| CALSOL 5550 | | 29 | 29 | 32 | 30 | 35 | 35 | 36 | 34 |
| VISCOWAX 116 | | | | 1 | | 1 | 1 | | |
| ADDITIVES | | 2.0 | 2.0 | 2.0 | 2.0 | 2.0 | 2.0 | 2.0 | 2.0 |
| SBC - Average styrene content (% by weight) | | 38 | 37 | 36 | 37 | 36 | 37 | 33 | 30 |
| SBC - Average diblock content (% by weight) | | 0 | 0 | 0 | 0 | 0 | 0 | 20.8 | 21.7 |
| Brookfield Viscosity @ 121 °C (cP) | | 7075 | 6188 | 2460 | 4650 | 2255 | 1778 | 4800 | 9200 |
| Brookfield Viscosity @ 135 °C (cP) | | 3750 | 3105 | 1365 | 2515 | 1192 | 1013 | 1995 | 4055 |

TABLE 1-continued

Control 1 is an SBC based positioning adhesive that does not include a modified SBC.

| | Control 1 | Ex 1 | Ex 2 | Ex 3 | Ex 4 | Ex 5 | Ex 6 | Ex 7 | Ex 8 |
|---|---|---|---|---|---|---|---|---|---|
| Brookfield Viscosity @ 149 °C (cP) | | 2099 | 1845 | 775 | 1398 | 692.5 | 607.5 | 1043 | 2180 |
| Brookfield Viscosity @ 163 °C (cP) | | 1230 | 1110 | 490 | 847.5 | 437.5 | 380 | NT | 1303 |
| Cotton | | | | | | | | | |
| Initial Peel (N/cm) | 1.44 | 1.10 | 1.13 | 0.97 | 1.21 | 0.88 | 0.87 | 1.37 | 1.43 |
| Humidity Incubated Peel (N/cm) | 1.01 | 1.16 | 4.06 | 1.36 | 1.46 | 0.96 | 0.92 | 1.68 | 2.05 |
| % Change | −29.8 | 5.4 | 42.0 | 40.7 | 21.2 | 9.4 | 5.0 | 22.2 | 43.6 |
| Microfiber | | | | | | | | | |
| Initial Peel (N/cm) | 0.78 | NT | NT | NT | NT | NT | NT | 0.67 | 0.65 |
| Humidity Incubated Peel (N/cm) | 0.75 | NT | NT | NT | NT | NT | NT | 0.82 | 1.08 |
| % Change | −4.8% | NT | NT | NT | NT | NT | NT | 22.4 | 66.2 |
| Stainless Steel (2 mil) | | | | | | | | | |
| Loop Tack (N/cm) | NT | NT | NT | NT | NT | NT | NT | NT | 11.9 |
| 180° Peel (N/cm) | NT | NT | NT | NT | NT | NT | NT | NT | 12.6 |
| HDPE (2 mils) | | | | | | | | | |
| Loop Tack (N/cm) | NT | NT | NT | NT | NT | NT | NT | NT | 8.3 |
| 180° Peel (N/cm) | NT | NT | NT | NT | NT | NT | NT | NT | 12 |

NT (Not Tested)

TABLE TWO

Control 2 is an SBC core adhesive that does not include a modified SBC.

| | Control 2 | Ex 9 | Ex 10 | Ex 11 |
|---|---|---|---|---|
| VECTOR 4211 | | 6 | 6 | 6 |
| KRATON FG1924 | | 6 | 5 | |
| TAIPOL 7126 | | | | 6 |
| VECTOR 4114A | | 6 | 7 | 6 |
| ESCOREZ 5400 | | 60 | 60 | 60 |
| CALSOL 5550 | | 20 | 20 | 20 |
| ANTIOXIDANT | | 2.0 | 2.0 | 2.0 |
| SBC - Average styrene content (% by weight) | 21 | 21 | 21 | 25 |
| SBC - Average diblock content (% by weight) | 14 | 14 | 16.3 | 14 |
| Brookfield Viscosity @ 121 °C (cP) | 10780 | NT | NT | NT |
| Brookfield Viscosity @ 135 °C (cP) | 5238 | 6813 | 7775 | 5425 |
| Brookfield Viscosity @ 149 °C (cP) | 2885 | 3720 | 4100 | 2700 |
| Brookfield Viscosity @ 163 °C (cP) | 1800 | 2225 | 2400 | 1505 |
| Core Peel Force - NW/NW | | | | |
| Initial Dry Peel (N/cm) | 0.28 | 0.83 | NT | NT |
| Initial Wet Peel (N/cm) | 0.36 | 1.04 | NT | NT |
| Core Peel Force - NW/Cotton | | | | |
| Initial Dry Peel (N/cm) | 0.09 | 0.29 | NT | NT |
| Initial Wet Peel (N/cm) | 0.03 | 0.06 | NT | NT |
| Core Peel Force - NW/Towel | | | | |
| Initial Dry Peel (N/cm) | 0.11 | 0.31 | NT | NT |
| Initial Wet Peel (N/cm) | 0.10 | 0.20 | NT | NT |
| Backsheet Lamination | | | | |
| Initial Peel (N/cm) - 3 gsm | 0.61 | 0.81 | 0.81 | 0.82 |
| Aged Peel (N/cm) - 3 gsm | 0.23 | 0.47 | 0.54 | 0.51 |

Other embodiments are within the claims.

What is claimed is:

1. A hot melt adhesive composition comprising:

i) from 5% by weight to 40% by weight of a non-modified styrenic block copolymer, ii) from 0.5% by weight to 15% by weight of a modified styrenic block copolymer, iii) from 30% by weight to 65% by weight of a tackifying agent, and iv) from 10% by weight to 45% by weight of a plasticizer, wherein the hot melt adhesive composition further comprises less than 5% by weight of a wax.

2. A disposable absorbent article comprising the hot melt adhesive composition of claim 1.

3. The hot melt adhesive composition of claim 1 comprising less than 4% by weight of a wax.

4. A hot melt pressure sensitive adhesive composition comprising the hot melt adhesive composition of claim 1.

5. The hot melt adhesive composition of claim 1 wherein the modified styrenic block copolymer is an organic acid or anhydride modified styrene block copolymer selected from the group consisting of poly(styrene-b-(ethylene-co-butylene)-b-styrene and poly(styrene-b-(ethylene-alt-propylene)-b-styrene) and poly(styrene-b-isobutylene-b-styrene).

6. The hot melt adhesive composition of claim 1 wherein the total of the non-modified styrenic block copolymer and the modified styrenic block copolymer has an average diblock content of from 0% by weight to 25% by weight and an average styrene content of from 15% by weight to 45% by weight.

7. The hot melt adhesive composition of claim 1 having a Brookfield Viscosity at 121° C. of no greater than 15,000 cP.

8. The hot melt adhesive composition of claim 1 having a total styrenic block copolymer content of from 8% by weight to 25% by weight.

9. The hot melt adhesive composition of claim 1 having a total styrenic block copolymer content of from 8% by weight to 22% by weight.

10. The hot melt adhesive composition of claim 1 wherein the modified styrenic block copolymer has a radial structure with from 3 to 10 arms, a hydrogenated mid-block, and a styrene content of from 6% by weight to 15% by weight.

11. The hot melt adhesive composition of claim 1 wherein the modified styrenic block copolymer has a radial structure with from 3 to 10 arms, a hydrogenated mid-block, and a styrene content of from 25% by weight to 45% by weight.

12. The hot melt adhesive composition of claim 1 wherein the modified styrenic block copolymer, the styrenic block copolymer, the tackifying agent and the plasticizer make up at least 90% by weight of the hot melt adhesive composition.

13. A hot melt pressure sensitive adhesive composition comprising:

i) from 5% by weight to 40% by weight of a non-modified styrene block copolymer, ii) from 1% by weight to 10% by weight of a modified styrenic block copolymer, iii) from 40% by weight to 60% by weight of a hydrogenated hydrocarbon tackifying agent, and iv) from 15% by weight to 45% by weight of an oil, wherein the hot melt adhesive composition further comprises less than 5% by weight of a wax.

14. The hot melt pressure sensitive adhesive composition of claim 13 wherein the total of the non-modified styrenic block copolymer and the modified styrenic block copolymer has an average styrene content of from 25% by weight to 45% by weight and an average diblock content of from 10% by weight to 25% by weight.

15. The hot melt pressure sensitive adhesive composition of claim 13 wherein the total of the non-modified styrenic block copolymer and the modified styrenic block copolymer has an average styrene content of from 15% by weight to 30% by weight and an average diblock content of from 10% by weight to 25% by weight.

16. A disposable absorbent article comprising the hot melt pressure sensitive adhesive composition of claim 13.

17. An article selected from the group consisting of medical tape, bandage, wearable device, athletic tape, kinesiology tape and wound dressing comprising the hot melt pressure sensitive adhesive composition of claim 13.

18. The hot melt pressure sensitive adhesive composition of claim 13, wherein the initial peel to cotton does not decrease when tested according to the Humidity Incubated Peel Test Method.

19. The hot melt pressure sensitive adhesive composition of claim 13 having a 180° peel to both stainless steel and high density polyethylene (HDPE) of least 5 N/cm when testing according to the 180° Peel Adhesion to HDPE or Stainless Steel Test Method.

* * * * *